United States Patent
Lu et al.

(10) Patent No.: US 6,785,227 B1
(45) Date of Patent: Aug. 31, 2004

(54) METHOD AND APPARATUS FOR MULTI-LAYER RESOURCE MANAGEMENT IN WIRELESS COMMUNICATIONS SYSTEMS

(75) Inventors: Ming Lu, Hillsborough, NJ (US); Robert C. Qiu, Rockaway, NJ (US); Pengfei Zhu, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/568,666

(22) Filed: May 11, 2000

(51) Int. Cl.[7] ................................................. H04L 1/00
(52) U.S. Cl. ....................... 370/229; 370/252; 370/332; 455/450; 455/13.4
(58) Field of Search ................................ 370/229, 252, 370/253, 332, 333, 469; 455/450, 13.4, 522, 68, 69, 67.3

(56) References Cited

U.S. PATENT DOCUMENTS 5,722,051 A * 2/1998 Agrawal et al. ............... 455/69
6,182,251 B1 * 1/2001 Rahnema et al. ............. 714/704
6,208,620 B1 * 3/2001 Sen et al. ....................... 370/231

* cited by examiner

Primary Examiner—Alpus H. Hsu
Assistant Examiner—M J Molinari

(57) ABSTRACT

A method and apparatus are provided for dynamically controlling a high speed wireless communication system capable of transmitting a message via a communication channel, to minimize the transmission power necessary for a single job and thereby increase system capacity. The communication channel is characterized by performance characteristics curves and physical channel characteristics curves. Channel conditions are sampled to model the performance characteristic curvers. Upon determining a minimum throughput to meet a Quality of Service requirement for user application, a first set of data pairs that correspond to the minimum throughput are determined from the performance characteristics curves. That first set of data pairs is in mapped to the physical channel characteristic curver and the data pair corresponding to minimum transmission power is then selected.

18 Claims, 6 Drawing Sheets

METHOD AND APPARATUS FOR MULTI-LAYER RESOURCE MANAGEMENT IN WIRELESS COMMUNICATIONS SYSTEMS

RELATED APPLICATIONS

The present invention is related to U.S. patent application Ser. No. 09/568,921, filed concurred herewith, entitled "Method and Apparatus for Multi User Resource Management in Wireless Communication Systems" which is assigned to the same assignee and is incorporated herein by reference.

FIELD OF THE INVENTION

This invention relates to wireless communication systems and, more particularly, to the establishment of system resource parameters as a function of user application requirements.

BACKGROUND OF THE INVENTION

Wireless communication systems allow the transmission of information signals between a mobile user and a fixed based station. The base station will typically be interconnected with one or more landline communications networks. Both analog (first generation) and digital (second/third generation) systems have been developed to transmit information signals over communication channels linking the mobile user with landline networks. Digital methods tend to afford several advantages over analog systems, including improved immunity to channel noise and interference, increased capacity, and encryption for secure communications.

First generation wireless systems were primarily directed to voice communication, but the digital technology of second and third-generation systems provides support for both voice and data applications. Several modulation/coding arrangements have been developed, such as frequency division multiple access (FDMA), time division multiple access (TDMA) and code division multiple access (CDMA), to increase the number of users that can access a wireless network. CDMA systems are more immune to multi-path distortion and co-channel interference than FDMA and TDMA systems and reduce the burden of frequency/channel planning that is common with FDMA and TDMA systems.

The base stations of a wireless network manage a variety of resources in the establishment of communications links with their associated mobile users. Among those resources are output power and data rate. Output power and data rate are proportionally related—the output power necessary to establish or maintain a link with a user increasing as the data rate increases. This increase in output power with increasing data rate is required to maintain the output energy per bit at a constant level. In the management of power output, a base station must balance the transmission needs of its users, individually and collectively, against inter-channel interference among the served mobile users, as well as constraints in respect to total output power for the base station.

Thus, upon a request for entry to the wireless network by a user, the base station must evaluate the user's data rate and power demands against the current user environment and power demands. As the user environment approaches the total system capacity, the base station may delay the entry of a user onto the system to prevent overloading the output power capability of the base station.

In the prior art, allocation of power and system resources is typically based on channel conditions only. While the network is generally aware of application requirements, a conventional transmission network does not address channel conditions in the establishment of application layer operation. Typically, the physical layer of the data channel is optimized based on operating parameters relating to the physical channel only and the application layer is optimized based only on the application layer Quality of Service (QoS) requirements.

Moreover, in a communications system utilizing power control, the allocation of the available RF power is usually dictated by a required Frame Error Rate (FER), with the power control system having a feedback mechanism for adjusting power to maintain the required FER under varying channel conditions. Thus, for a given required FER, the output power will vary depending on the difference between the required FER and the FER experienced due to the channel. The instantaneous Eb/Io ratio (essentially, the digital signal-to-noise ratio) for the channel is controlled by the excursion around that set point in the inner loop of the power control system. Once a target FER is set, the power control system operates to dynamically allocate the RF power to overcome channel fades and interference in order to maintain the experienced FER within a tolerable deviation from the required FER.

With the current CDMA standard (IS-95A & B), the FER is a fixed system parameter set by an operator. For voice calls, FERs are usually set between 1% and 2% to meet a required Merit of Service (MoS) parameter. However, no MoS-like criteria exists for data applications.

Thus, there is a need to provide an efficient FER selection criteria for data applications and to provide a linkage between the application layer and the physical layer for a channel in respect to channel resource allocation.

SUMMARY OF THE INVENTION

A method is provided for intelligent utilization of the power and system resources in a wireless communication system through a multiple layer optimization. In particular, the invention provides dynamic interaction between the different protocol layers in the wireless system by intelligent mapping of application layer QoS requirements down to physical layer system operating parameters The method will seamlessly control the operating parameters in each individual layer adaptive to different radio link conditions and resource availability.

The methodology of the invention operates to map a set of data points relating to performance characteristics associated with the application layer to a corresponding set of data points relating to physical layer performance characteristics, and through such mapping, to determine an optimum resource allocation in respect to the application requirements and channel conditions. In a preferred embodiment of the invention, the performance characteristics are established in terms of frame error rate and data rate.

In support of the method of the invention, performance characteristics for the application and the channel are determined and stored in the form of a set of tables or corresponding curves (or mathematical equivalents thereof). A required performance parameter for the application under consideration (e.g., data throughput) is then determined and tested against the predetermined application performance criteria to find points of intersection with curves representing potential data rates for transmission through the channel. Data points representing such points of intersection are then mapped to corresponding data points on performance characteristic curves for the physical channel. From that mapping, an FER and a data rate can be selected to optimize system power allocation in respect to the data throughput requirement for the application and the characteristics of the selected channel.

In an alternative embodiment, channel conditions may be periodically sampled to model the performance characteristic curves in respect to temporal changes in the RF environment. The steps of the method of the invention are then iteratively repeated as the performance characteristic curves are updated, in order to dynamically control the system resource allocation under changing channel conditions.

DETAILED DESCRIPTION OF THE INVENTION

In wireless networks supporting relatively high data rate data communications applications, channel utilization must be carefully managed to avoid delays in transmission caused by inefficient channel utilization. As shown hereafter, the invention provides a novel methodology to manage the communication channel so as to utilize minimal power needed to achieve a required throughput for a given data application, thereby increasing system gain. Although the invention is described in terms of a preferred embodiment based on CDMA encoding of the wireless signals, it should be apparent that the methodology of the invention can also be applied for other wireless channelization arrangements, including Wideband CDMA (W-CDMA), TDMA and GSM.

Figure 1:
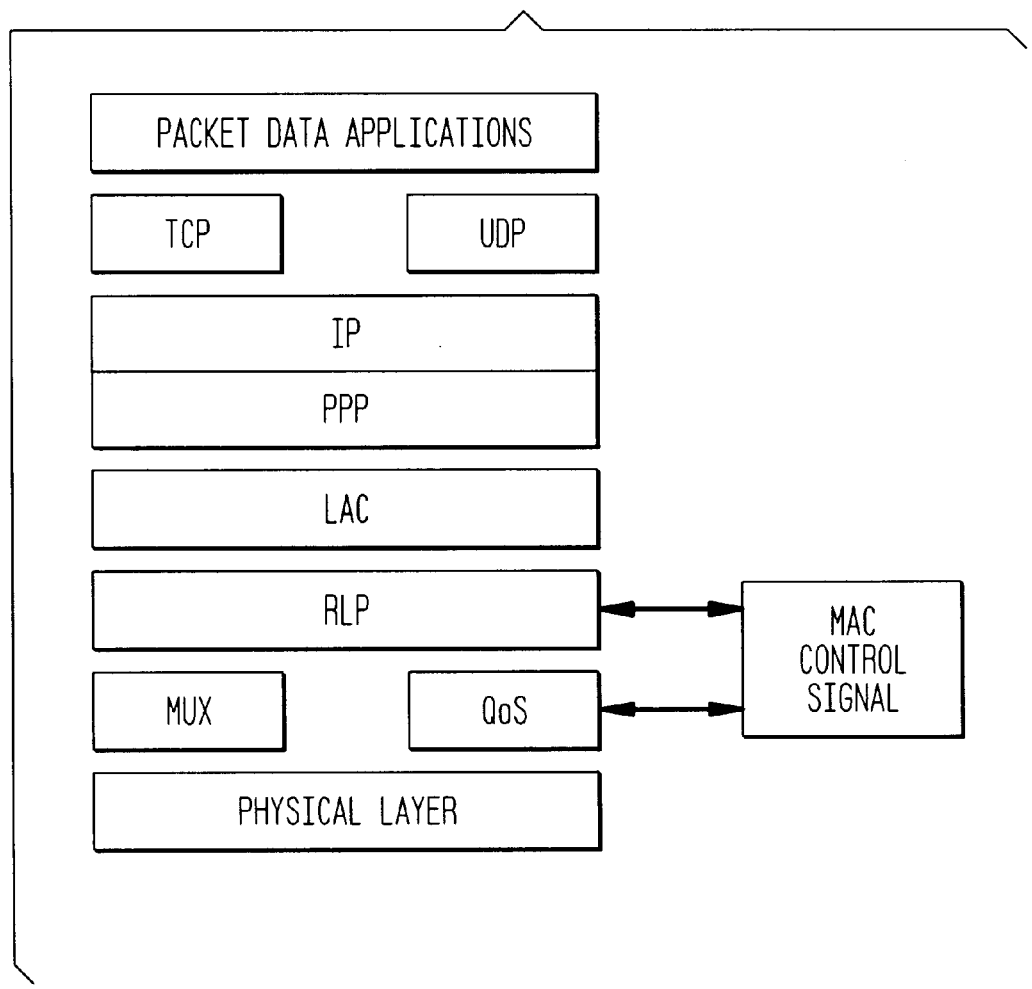
FIG. 1 illustrates a typical structure of an IS2000 Packet Data Protocol Stack as applied in a wireless communication system in respect to operation of the methodology of the invention.

An important characteristic of the invention is the establishment of a linkage between application layer parameters and physical layer parameters, and thereby to determine an optimum resource allocation in respect to the application requirements and channel conditions. To provide a structural perspective for such linkage, consider the IS2000 Packet Data Protocol Stack for a wireless communications system as depicted in FIG. 1. This Open Systems Interconnect (OSI) reference model characterizes computer communication utilizing seven layers that segment different aspects and needs for end-to-end data transmission. Each of the seven OSI layers in the protocol communicates with its peer layer at a distant end and with the local layers immediately above and below it. The first layer, the Physical Layer, describes the wireless air interface. The second layer, the link layer, converts bits from the Physical Layer into frames of data.

The second layer comprises a Multiplexer (Mux), a Quality Of Service (QoS) Controller, a Radio Link Protocol (RLP) and a Link Access Control (LAC). The RLP and QoS controller are driven by the Medium Access Control signal (MAC). OSI layers 3 through 7 lie above OSI layer 2. Those layers comprise a Point-to-Point Protocol layer, an Internet Protocol (IP) layer, Transmission Control Protocol (TCP) layer, a User Datagram Protocol (UDP) layer and a Packet Data Application layer.

The methodology of the invention provides dynamic interaction between the different layers in the system with an intelligent mapping of Packet Data Application layer QoS requirements down to Physical Layer system operating parameters. The method seamlessly controls the operating parameters in each individual layer adaptive to different radio link conditions and the resource availability for optimized system performance. In particular, the invention defines a dynamic interactive interface between the Physical Layer, the RLP layer and the TCP/IP layer which optimizes such an interface to meet Packet Data Application layer QoS requirements using a frame error rate and data rate selected to achieve a minimum usage of radio link resources.

In carrying out the method of the invention, a performance parameter which is to be met by the application under consideration, e.g., data throughput, is evaluated relative to a set of performance characteristic curves (or tables) related to the application layer, as described in more detail below. In a preferred embodiment of the invention, those performance characteristic curves will describe data throughput and frame error rate characteristics. For a given channel condition, multiple curves, each corresponding to a data rate supported by the wireless system, will be plotted. The data points from which such characteristic curves are plotted are known, or at least computable, prior to transmission of a data file for the application under consideration. Construction of such a set of curves, or the mathematical equivalent thereof stored in a computer memory, will be well understood by those skilled in the art of the invention.

Figure 2:
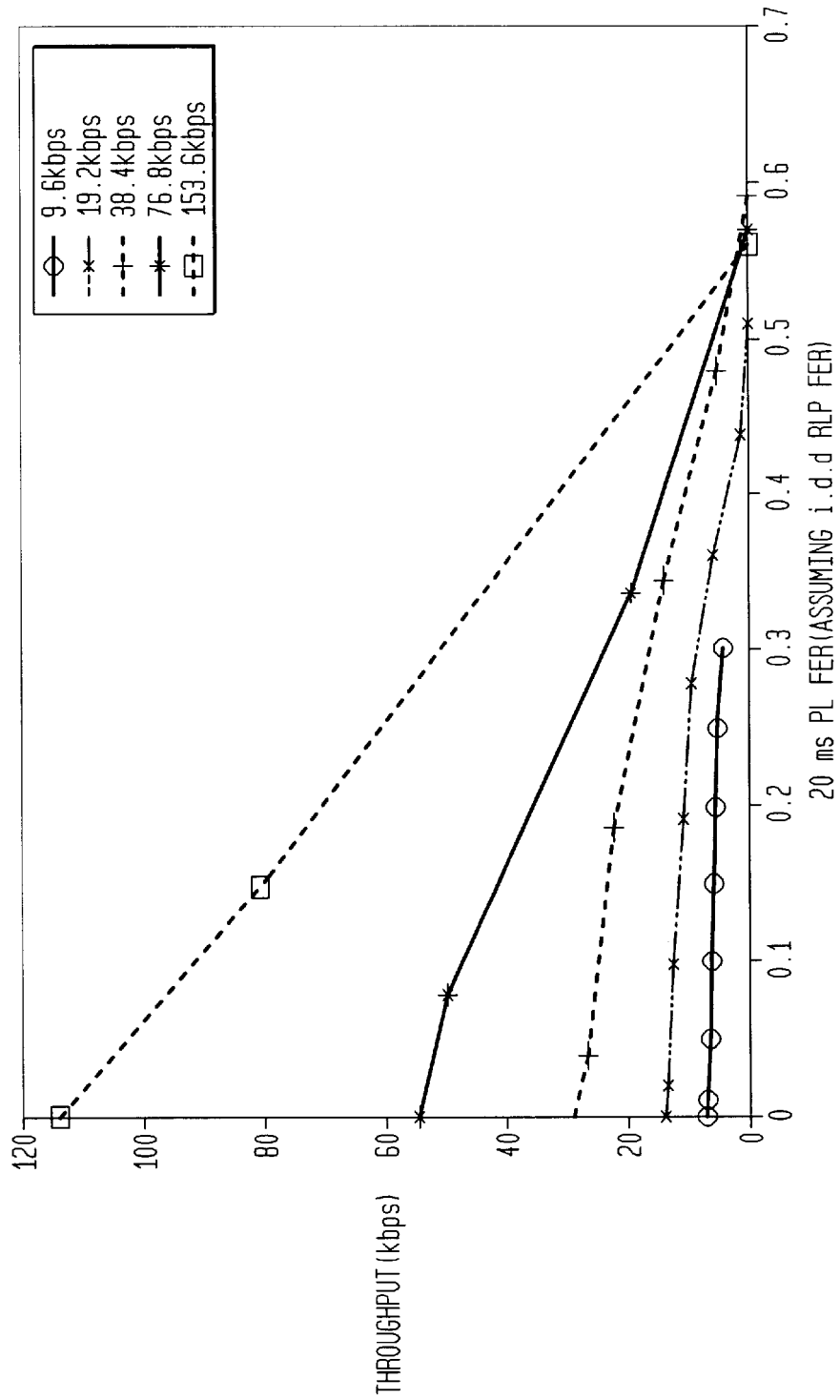
FIG. 2 depicts an exemplary set of performance characteristic curves for a wireless channel in which the methodology of the invention is employed.

An exemplary set of such application-layer performance characteristic curves is illustrated in FIG. 2. These performance characteristic curves model the communication channel for various data rates in respect to channel throughput and a corresponding frame error rate experienced for a given throughput at the selected data rate. As can be seen in the figure, these exemplary performance characteristic curves describe the Transmission Control Protocol-Internet Protocol/Radio Link Protocol Throughput (TCP-IP/RLP Throughput) versus Frame Error Rate (FER) for an exemplary application layer in an IS2000 Packet Data Protocol Stack. For example, at a data rate of 38.4 kbps, a throughput of approximately 30 kbps is possible with an approximately 0% FER, while a throughput of approximately 20 kbps is possible with an approximately 35% FER.

A second set of performance characteristic curves (or tables) related to the physical layer (channel) is then determined and the invention operates to map data points corresponding to the required throughput from the application-layer performance curves to the physical layer performance curves, as explained in more detail below. For a preferred embodiment of the invention, the physical-layer performance characteristic curves are described in terms of FER and Eb/No performance characteristics. As is known, transmission power for a channel is a function of the Eb/No parameter, and thus such a set of performance characteristic curves is also related to the output power for the channel. These FER—Eb/No characteristic curves are derived from channel information such as Doppler frequency, Rician K factor, channel delay profile and other channel fading parameters.

As with the application-layer characteristic curves, for a given channel condition, there are also multiple curves corresponding to different data rates available in the physical layer. And, like the application-layer curves, these physical-layer characteristic curves can be derived based on a general channel conditions and independent of any particular data transmission from the application layer. Construction of such a set of curves, or the mathematical equivalent thereof stored in a computer memory, will be well understood by those skilled in the art of the invention.

Figure 3:
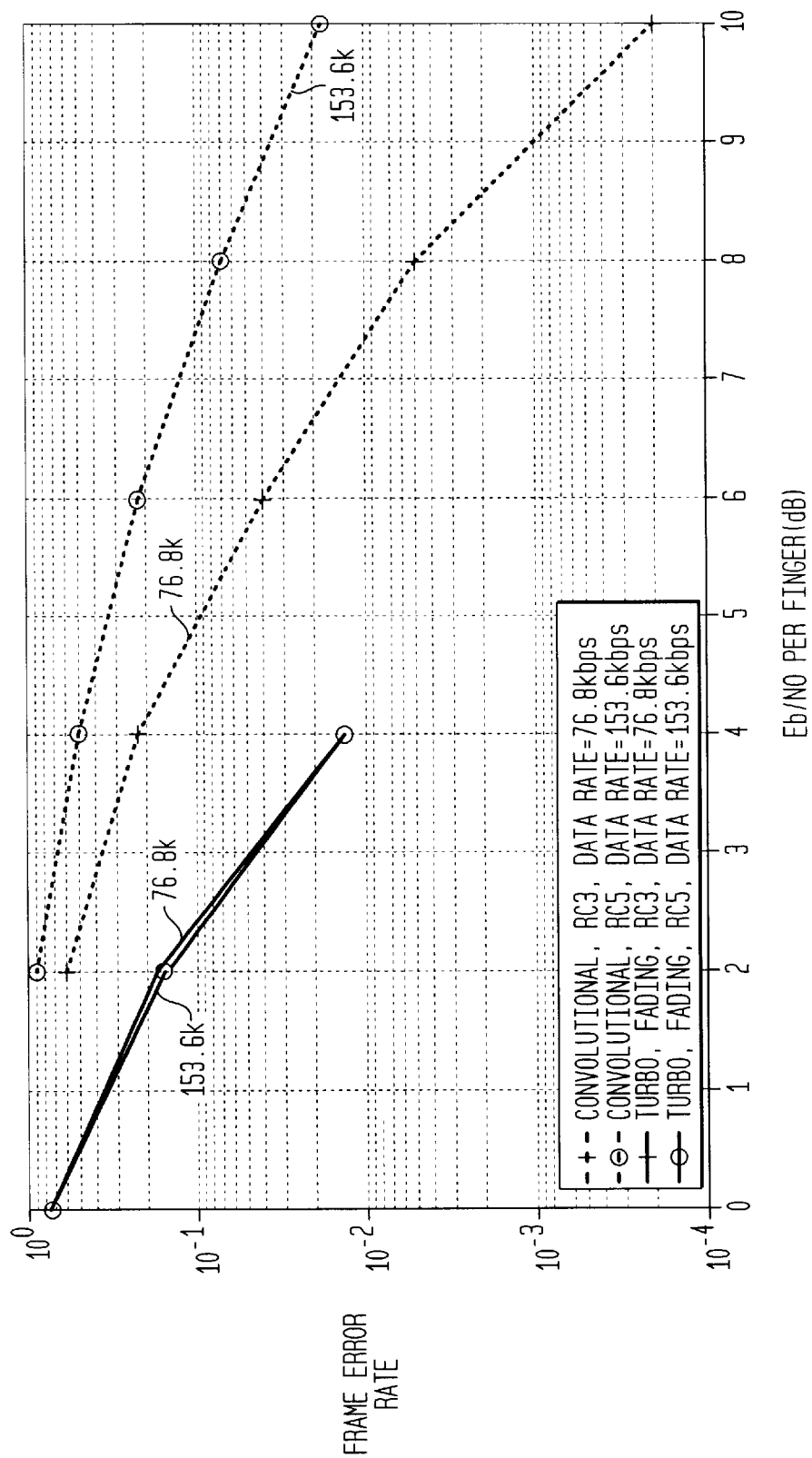
FIG. 3 depicts an exemplary set of physical channel characteristic curves for a wireless channel in which the methodology of the invention is employed.

An exemplary set of physical channel characteristic curves is illustrated in FIG. 3. The physical channel characteristic curves model the communication channel for various data rates as a function of a frame error rate and a corresponding energy per bit (in relation to a noise factor) for the transmission of information over the channel. Specifically, the exemplary physical channel characteristic curves describe the IS 2000 physical layer Frame Error Rate (FER) versus Energy per Bit/Noise (Eb/No) for an exemplary communication channel. For example, using the convolutional coding case, at a data rate of 76.8 kbps and an approximately 3%FER, an Eb/No of approximately 6 db is required, while at a data rate of 153.6 kbps and an approximately 20%FER, an Eb/No of approximately 6 db is required. [Note that data rate curves are also shown in FIG. 3 for the case of turbo coding, as the methodology of the invention would be equally applicable to that case. However, all examples used herein to describe the invention are referenced to the convolutional coding case.]

Based on the application-layer performance characteristic curves and the physical channel characteristics curves that characterize the communication channel, the method of the invention operates to achieve a minimal channel transmission power to provide a desired quality of service at the application layer. The methodology of the invention can be more completely described with reference to FIG. 4, which depicts the steps of the methodology in a flowchart form. As an initial step, channel condition information is gathered (according to step 418) for determination of the application-layer performance characteristic curves and the physical-layer characteristic curves heretofore described—that channel condition information including, e.g., Doppler frequency, Rician K factor, channel delay profile and other channel fading parameters. The gathered channel-condition information is then used to develop the set of application-layer performance characteristic curves and the physical-layer characteristic curves in respect to the channel under consideration.

Figure 4:
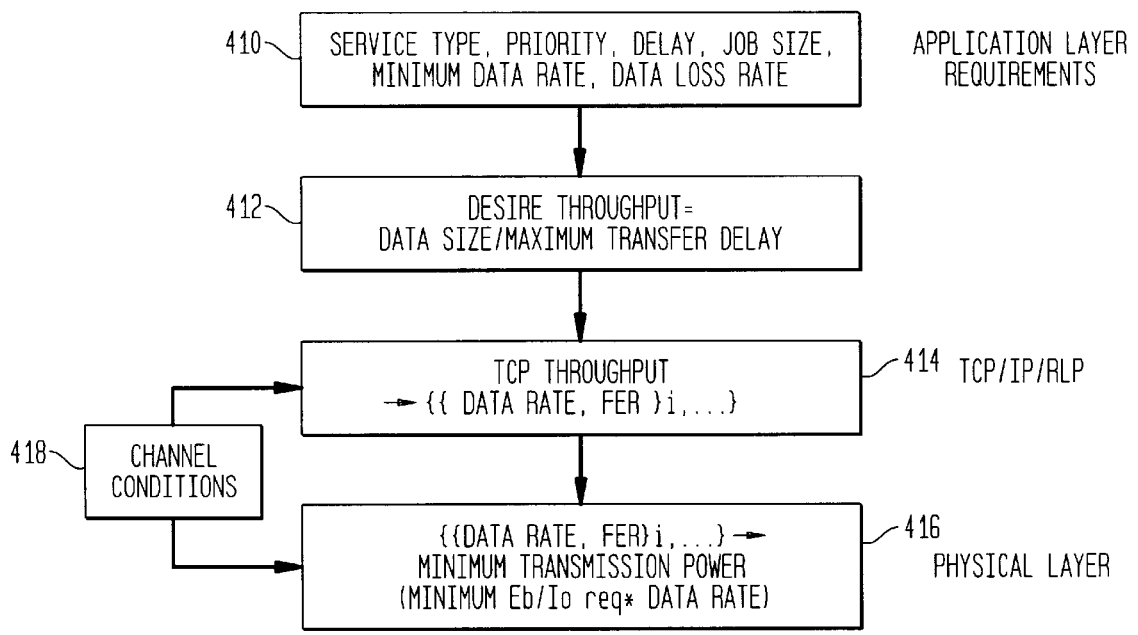
FIG. 4 is a flow chart illustrating a channel resource optimization according to the method of the invention.

At step 410 of the flowchart of FIG. 4, application layer requirements are determined. These application layer requirements include service type, priority, transfer delay (i.e., an acceptable transmission duration for a data file to be transmitted), job size and minimum data loss. Other application layer requirements known to those skilled in the art may also be taken into consideration. At step 412, the minimum throughput required to meet a Quality of Service (QoS) requirement is determined. Typically, the minimum throughput is calculated as the size of a a data file to be transmitted divided by a maximum acceptable transfer delay.

Figure 5:
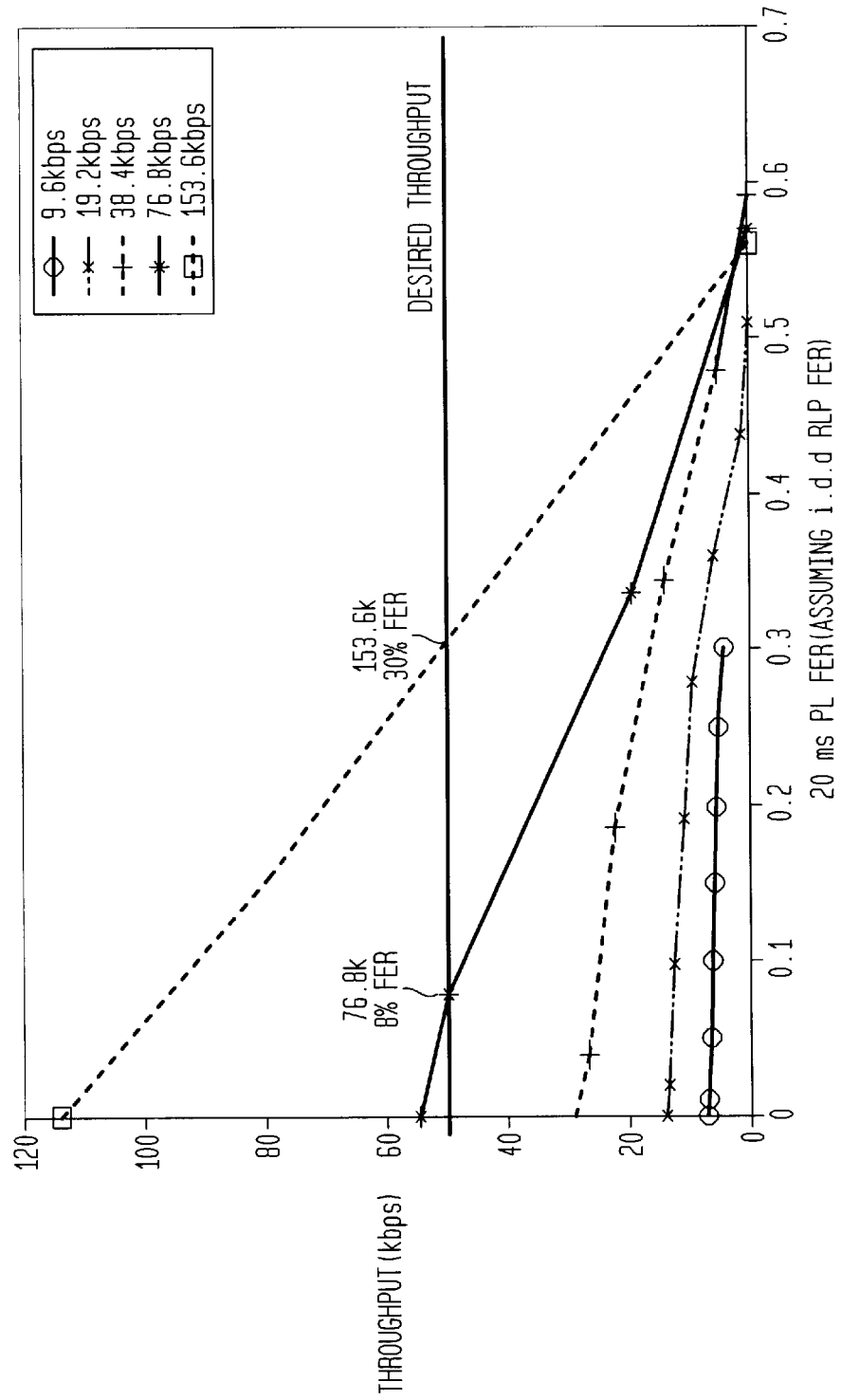
FIG. 5 illustrates intersecting data points for a desired data throughput and channel performance curves plotting Frame Error Rate as a function of channel throughput for a plurality of channel data rates.

At step 414, a first set of data pairs—{data rate, frame error rate}—are read from the TCP/IP and RLP, or higher-layer performance characteristic curves corresponding to the minimum throughput—those data points representing an intersection of a horizontal line representing the minimum throughput with two or more of the curves representing available data rates. Operation of this step is illustrated in FIG. 5, which shows selection of the {data rate, frame error rate} data points for a required application layer throughput in respect to the exemplary application-layer performance characteristic curves previously described in connection with FIG. 2. As can be seen in the figure, at the desired throughput 510, there are two options for the configuration of the communication channel. The desired throughput can be achieved by employing a data rate of 76.8 kbps with an 8% FER or a date rate of 153.6 kbps with a 30% FER.

At step 416, the set of data pairs read from the application-layer performance characteristic curves in step 414 are mapped to corresponding FER points on the data rate curves plotted in the physical-layer characteristic curves. In those physical-layer characteristic curves, each mapped {data rate, frame error rate} pair will correspond to an Eb/No value for the channel under consideration. Using those corresponding Eb/No values, the {data rate, frame error rate} pair corresponding to minimum transmission power is selected. Once the {data rate, frame error rate} pair corresponding to the minimum-power Eb/No value have been selected, the physical channel for the data rate corresponding to the minimum transmission power may be selected and the FER corresponding to the minimum transmission power applied by the power control system, which operates to adjust to the channel transmission power level to maintain that FER.

Figure 6:
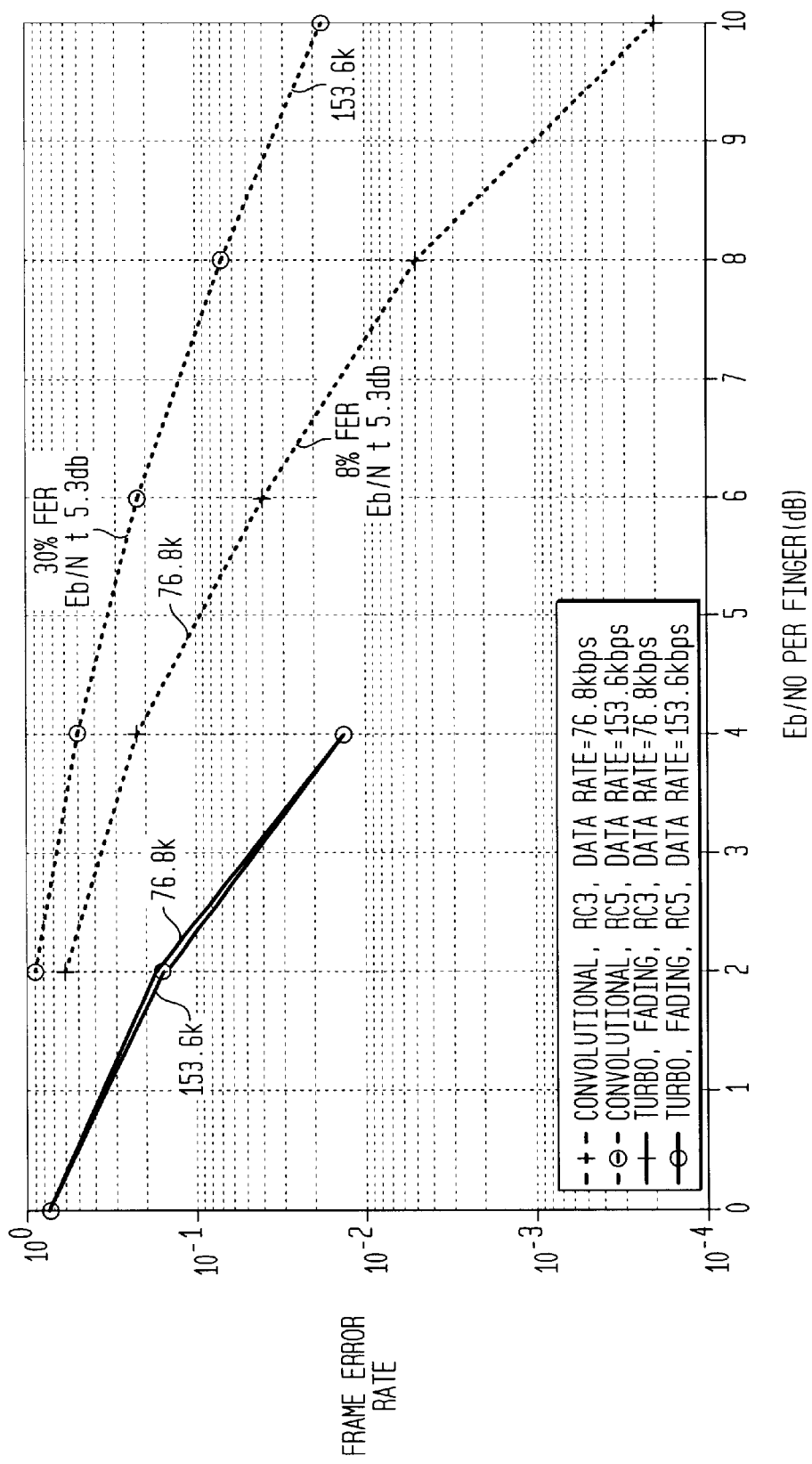
FIG. 6 illustrates data points corresponding to the intersection data points of FIG. 5 for a set of physical channel characteristic curves (Frame Error Rate as a function of Eb/No) for the corresponding wireless channel.

Operation of this step is illustrated in FIG. 6, which shows the mapping of the data points selected in step 414 to the data rate performance characteristic curves for the physical channel (those physical-channel performance characteristic curves corresponding to the exemplary physical-channel performance characteristic curves previously described in conjunction with FIG. 3). As can be seen in the figure, at a data rate of 76.8 kbps and a 8% FER (a first data pair mapped from the application-layer performance characteristic curves), an Eb/No value of 5.3 db is required. Similarly, at a date rate of 153.6 kbps and a 30% FER (the second data pair mapped from the application layer performance characteristic curves), an Eb/No value of 5.3 db is also required.

While the equality of the Eb/No values for each of the mapped data pairs is a coincidence in this exemplary case, the phenomena illustrates an important facet of the parameter selection process. As is well-known, channel transmission power is equal to Eb/No multiplied by the data rate. Therefore, with the Eb/No values being equal, but one of the mapped data rates being double that of the other mapped data rate, selection of the lower data rate results in a 50 percent saving in channel transmission power while still achieving the required throughput for the application layer. Accordingly, in this example, a data rate 76.8 kbps and an 8% FER are selected for configuration of the communications channel, resulting in achievement of the required data throughput with the use of minimum transmission power.

In the foregoing description of the method of the invention, it is assumed that the step of gathering channel condition information is performed in advance of a transmission of a data file from the application layer, and that the application-layer and physical-layer performance characteristic curves so determined are applied to the selection of a data rate and an FER which will be in effect throughout the data transfer operation. In a further embodiment out the invention, both the information gathering and data-rate/FER selection steps may be iteratively repeated and may be performed on-the-fly. In the iterative method, channel conditions of the communication channel are periodically sampled at step 418. At each resampling of the channel conditions and corresponding determination of new application-layer and physical-layer performance characteristic curves, the method then returns to step 414 and repeats steps 414-416 to determine a new {data rate, frame error rate} pair to achieve a required data throughput at the minimum channel transmission power.

It should be apparent from the foregoing that the method of the invention results in a balancing between application-layer considerations and physical-layer considerations to achieve an overall gain in system capacity. In many, if not most cases, a higher FER will be selected than would otherwise have been chosen in respect to application-layer considerations. Such a higher FER leads to increased RLP retransmission and reduced TCP throughput at the application layer. However, by mapping that higher FER, together with a data rate required to achieve necessary data throughput at that FER, to the physical layer, a reduction in channel transmission power for that application can be selected to achieve the necessary data throughput while increasing overall system capacity—i.e., the power increment which would otherwise have been applied for the data application under consideration (and is thereby saved pursuant to the methodology of the invention) may be made available for another application using the wireless system.

The method of the invention may be implemented in a "processor" that is capable of configuring the communication channel and is linked with a memory. In this embodiment, the memory will contain tables that characterize the performance characteristics curves and the physical layer characteristics curves. The processor will monitor the communication channel, interact with characteristic curves stored in the memory, and configure the communication channel after performing the method described above. Alternatively, the processor may update the characteristics curves in response to monitored conditions. The functions performed by the processor may be provided through the use of either shared or dedicated hardware, including, but not limited to, hardware capable of executing software. Use of the term "processor" should not be construed to refer exclusively to hardware capable of executing software. Illustrative embodiments of the processor may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

CONCLUSION

The invention provides a novel method for dynamically allocating system resources in order that a data message be transmitted at a desired thoughput and at a minimum channel power level. The method dynamically chooses a frame error rate (FER) and data rate such that minimum system power is utilized to achieve the desired thoughput. The savings in system power translates into a corresponding gain in system capacity.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed:

1. In a wireless communication system having a transmitter and at least one receiver coupled via a communication channel and operable to provide a communications path for at least one user application, a method for allocation of system resources among system transmitters comprising the steps of:

determining a first and a second set of performance characteristic curves based on predetermined channel condition information in respect to said communications channel, wherein said first set of performance characteristic curves represents parameter values for an application layer of a layered protocol model for said communications channel and said second set of performance characteristic curves represents parameter values for a physical layer of said layered protocol model;

determining a Quality of Service (QOS) requirement for said user application;

determining a set of data pairs on said first set of performance characteristic curves that correspond to said QOS requirement;

mapping said determined set of data pairs on said first set of performance characteristic curves to a corresponding set of data pairs on said second set of performance characteristic curves, each said mapped data pair on said second set of performance characteristic curves being functionally related to a transmission power level in said communications channel;

from said mapped data pairs on said second set of performance characteristic curves, selecting a pair corresponding to a lower transmission power level in said communications channel.

2. The method for resource allocation of claim 1 wherein said QOS requirement is specified in terms of a minimum throughput for data transmitted from said user application.

3. The method for resource allocation of claim 2 wherein said minimum throughput is determined as a function of a data increment for transmission from said user application and a maximum acceptable transfer delay.

4. The method for resource allocation of claim 1 wherein said set of data pairs determined on said first set of performance characteristic curves comprise a data rate value and a frame error rate value.

5. The method for resource allocation of claim 1 wherein said transmission power levels corresponding to said mapped data pairs on said second set of performance characteristic curves are expressed in terms of energy-per-bit to noise ratio (Eb/No) values.

6. The method for resource allocation of claim 1 further comprising the steps of:

iteratively sampling a channel condition of said communication channel; and determining said first and said second set of performance characteristic curves corresponding to said channel condition for each said iteration.

7. The method for resource allocation of claim 5 wherein said steps are performed on-the-fly.

8. The method for resource allocation of claim 1 wherein said selected data pair corresponding to a lower transmission power level is provided to a transmitter serving said communications channel, said transmitter being thereby operative to maintain performance characteristic parameters corresponding to said selected data pair.

9. The method for resource allocation of claim 1 wherein said predetermined channel condition information is characterized in terms of one or more parameters selected from the group consisting of Doppler frequency, Rician K factor, channel delay profile and channel fading.

10. The method for resource allocation of claim 1 wherein said first set of performance characteristic curves are functionally related to a Transmission Control Protocol/Internet Protocol and a Radio Link Protocol.

11. In a wireless communication system having a transmitter and at least one receiver coupled via a communication channel and operable to provide a communications path for at least one user application, an apparatus for allocating system resources among system transmitters comprising:

a memory established to store a first and a second set of performance characteristic curves, said curves being determined as a function of channel condition information in respect to said communications channel, wherein said first set of performance characteristic curves represents parameter values for an application layer of a layered protocol model for said communications channel and said second set of performance characteristic curves represents parameter values for a physical layer of said layered protocol model;

means to determine a Quality of Service (QOS) requirement for said user application;

means to determine a set of data pairs on said first set of performance characteristic curves that correspond to said QOS requirement;

mapping means for mapping said determined set of data pairs on said first set of performance characteristic curves to a corresponding set of data pairs on said second set of performance characteristic curves, wherein each said mapped data pair on said second set of performance characteristic curves is functionally related to a transmission power level in said communications channel;

selection means operative to identify and select a one of said mapped data pairs on said second set of performance characteristic curves corresponding to a lower transmission power level in said communications channel.

12. The apparatus for allocating system resources of claim 11 wherein said QOS requirement is specified in terms of a minimum throughput for data transmitted from said user application.

13. The apparatus for allocating system resources of claim 11 wherein said set of data pairs determined on said first set of performance characteristic curves comprise a data rate value and a frame error rate value.

14. The apparatus for allocating system resources of claim 11 wherein said transmission power levels corresponding to said mapped data pairs on said second set of performance characteristic curves are expressed in terms of energy-per-bit to noise ratio (Eb/No) values.

15. The apparatus for allocating system resources of claim 11 further comprising:

sampling means for iteratively sampling a channel condition of said communication channel.

16. The apparatus for allocating system resources of claim 11 further comprising:

means for loading said selected data pair corresponding to a lower transmission power level into a transmitter serving said communications channel.

17. The apparatus for allocating system resources of claim 11 wherein said channel condition information is characterized in terms of one or more parameters selected from the group consisting of Doppler frequency, Rician K factor, channel delay profile and channel fading.

18. The apparatus for allocating system resources of claim 11 wherein said first set of performance characteristic curves are functionally related to a Transmission Control Protocol/Internet Protocol and a Radio Link Protocol.

* * * * *